United States Patent Office 3,102,104
Patented Aug. 27, 1963

3,102,104
VULCANIZATION OF BUTYL RUBBER WITH A METHYLENE-BRIDGED TRIPHENOLDIMETHANOL
George H. Brice, Glen Rock, N.J., assignor to United States Rubber Company, New York, N.Y., a corporation of New Jersey
No Drawing. Filed Mar. 9, 1959, Ser. No. 797,881
4 Claims. (Cl. 260—43)

This invention relates to a new method of vulcanizing butyl rubber by means of certain methylene-bridged triphenoldimethanols and the benzylic esters corresponding to them.

The vulcanizing agents of this invention have the structure.

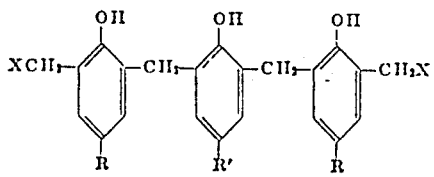

where X is either —OH, —OCOR", —Cl or —Br, where R, R', and R" are alkyl groups which can be either alike or different, where at least one of R and R' contains at least 3 carbon atoms, and where R" contains from 1 to 17 carbon atoms.

It has been previously disclosed in U.S. Patent No. 2,701,895, issued to Tawney and Little on February 15, 1955, that excellent vulcanization of butyl rubber can be effected by 2,6-dihydroxymethyl-4-hydrocarbylphenols and their self-condensation products. Such an improved method of vulcanizing or curing butyl rubber is particularly valuable when accelerated by heavy metal halides, as disclosed in U.S. Patent No. 2,726,224, issued to Peterson and Batts on December 6, 1955. As disclosed in U.S. Patent No. 2,830,970, issued to Tawney on April 15, 1958, the 2,6-di(acyloxymethyl)-4-hydrocarboylphenols will also cure butyl-rubber at a practical rate when, and only when, accelerated by heavy-metal halides. Thus, there has been an urgent need to provide an improved method of vulcanizing butyl rubber with phenolic curing agents which would proceed sufficiently rapidly without the use of acidic accelerators.

This can now be accomplished with the curing agents of this invention.

It has been found that butyl rubber can be cured or vulcanized by heating it in admixture with either certain methylene-bridged triphenoldimethanols, or the corresponding benzylic diesters in which the alcohol groups of the dimethanol have been esterified with an aliphatic monocarboxylic acid or with hydrogen chloride or hydrogen bromide. The outstanding feature that these three types of trinuclear phenolic compounds have in common is that they all cure butyl rubber at a practical rate in the absence of acidic accelerators such as the heavy metal halides. This is a wholly unexpected result because these methylene-bridged trinuclear phenolic compounds, in contradistinction to the self-condensation polymers of the 2,6-di(hydroxymethyl)-4-hydrocarbylphenols, exhibit a vulcanizing activity in butyl rubber which unpredictably is far faster than that of either the related monomeric 2,6-di(hydroxymethyl)-4-hydrocarbylphenols or the self-condensation polymers of these mononuclear monomers.

The term "butyl rubber" is used herein in its conventional sense to refer to that known class of synthetic rubbers typically made by low temperature copolymerization of an isoolefin with a minor amount of a diolefin hydrocarbon formerly designated as GR-I rubber and now commonly referred to as IIR rubber. The term IIR is recommended by Rubber World, April 1957, page 55; and is tentatively recommended by the American Society for Testing Materials in the 1956 "Supplement to Book of ASTM Standards Including Tentatives—Part 6, Plastics, Electrical Insulation, Rubber, Electronic Materials," page 201, ASTM 1418-56T. Commercial butyl rubbers usually contain from about 0.5 to 10% of copolymerized diolefin, as exemplified by IIR-15 and IIR-25.

The isoolefins used generally have from 4 to 7 carbon atoms, and such isomonoolefins as isobutylene and 2-methyl-2-butene are preferred. The diolefin hydrocarbon is a conjugated diolefin having from 4 to 8 carbon atoms. Isoprene and butadiene are the most important of these diolefins; others are piperylene, 2,3-dimethyl-butadiene, 3-methyl-1,3-pentadiene, 2-methyl-1,3-pentadiene, 1,3-hexadiene and 2,4-hexadiene. The basic copolymer may be modified, if desired, either by including other copolymerizable materials in the original preparation of the copolymer, or by treating the previously prepared copolymer with reactive reagents. Thus the rubbery copolymer of an isoolefin, such as isobutylene, containing 0.5 to 10% of copolymerized diolefin, such as isoprene, may be modified by the presence of a third co-monomer, namely, a chlorinated diolefin (e.g., chloroprene), in the copolymerization reaction mixture. Similarly, other modifying monomers, such as allyl chloride or methallyl chloride, may be present during the preparation of the copolymer. The final copolymer usually contains from 0.5 to 10% of the diolefinic material. The content of isoolefin may vary from 80 to 99.5%, depending on whether additional monomers are present; the isoolefin content usually amounts to from 90 to 99.5%. Alternatively, the copolymer may be modified by subjecting the previously prepared copolymer to the action of halogens, usually chlorine or bromine, to produce a modified copolymer containing, for example, 0.2 to 10% of chlorine or bromine (see, for example, U.S. Patents 2,732,354, Morrissey et al., January 24, 1956; 2,631,984, Crawford et al., March 17, 1953; 2,700,997, Morrissey et al., February 1, 1955; and 2,720,-479, Crawford et al., October 11, 1955). Examples of commercially available rubbery copolymers of an isoolefin with 0.5 to 10% of a diolefin include IIR-15, "Enjay Butyl B-11" (the latter being a modified copolymer containing chlorine) and "Hycar 2202" (the latter being a modified copolymer containing bromine). Hence, the expressions "butyl rubber," or "rubbery copolymer of an isoolefin with from 0.5 to 10% of a diolefin," or similar expressions, as used herein therefore contemplate the various known modified forms of the butyl rubber copolymer, as well as the unmodified copolymer.

Butyl rubber, by virtue of its low olefinic unsaturation, exhibits a well-known behavior toward vulcanizing agents which is markedly different from that of the highly unsaturated rubbers, such as Hevea rubber and synthetic rubbers SBR (butadiene-styrene copolymer) and NBR (butadiene-acrylonitrile copolymer). The vulcanization of butyl rubber has always presented a special problem, and although it is possible to vulcanize butyl with sulfur and conventional accelerators, such sulfur vulcanization has not been entirely satisfactory for many purposes, and hence the continuing search for improved ways of curing butyl rubber.

The amount of phenolic curing agent employed in this invention usually ranges (by weight) from about 0.25 part to about 20 parts per 100 parts of butyl rubber. For optimum cure the preferred range of the curing agent is from about 3 parts to about 16 parts per 100 parts of the rubber. When used as a chemical promoter for heat treatment by high-temperature milling, as described below, the preferred amount is in the range of from about 0.25 part to less than 3 parts.

In accordance with standard practice in rubber technology, the butyl rubber (in which category are included all of the unmodified and modified isoolefin-diolefin copolymers referred to above) is mixed with the curing agent together with any additional desired compounding ingredients, in any desired order according to the procedures ordinarily used in mixing rubber compounds, with the aid of the usual rubber mixing equipment such as an internal mixer or a roll mill.

Other modifying or compounding ingredients may be fillers, including carbon black, clays, hydrated silica, whiting, or the like, as well as pigments and dyes, and mold release agents, blowing agents, softeners, plasticizers, tackifying agents and soaps such as zinc laurate.

For stocks containing reinforcing fillers it is customary in butyl technology to first make a masterbatch comprising butyl rubber, filler and a small amount of a selected chemical promoter. The masterbatch is then given a heat treatment by milling it at high temperatures for a short period of time. The curing agents of this invention may be used as chemical promoters for this heat treatment, the recommended amount being about 0.25 part to about 2.0 parts at temperatures of about 350° F. for about 10 minutes.

Other chemical promoters for heat treatment of butyl rubber may likewise be used, prior to incorporation of a curing agent according to the present invention. Such promoters are various nitroso compounds, N-chloro cyclic imides, and phenolic resoles known as curing agents for butyl rubber. The general method is described by Iknayan et al. in U.S. Patent 2,702,287. Advantages of this preliminary heat treatment include improved processing characteristics, improved dispersion of carbon black, silica or other fillers in the butyl rubber, and lower hysteresis of the eventual vulcanizates. After completion of the hot-milling step, other compounding ingredients including an appropriate quantity of any desired curing agent (which may, for example, be a phenolic curing agent of this invention or may be any of the phenolic resoles disclosed by Iknayan et al., U.S. 2,702,287) are then added and the mix is shaped and vulcanized.

The vulcanization of butyl rubber with the curing agents of this invention is accomplished by heating the compounded and shaped rubber to a temperature of, for example, from about 125° C. to about 200° C. The time required substantially to complete the cure will vary widely in practice, depending on such variables as the quantity of the curing agent employed, the temperature at which the process is carried out, the size of the article being cured, the type of apparatus, etc. In general, it may be stated that satisfactory cures may be obtained within curing times ranging between about 2 minutes and about 8 hours. It will be understood that the time required will in general be inversely related to the quantity of the vulcanizing agent contained in the compounded butyl rubber stock, and to the temperature existing during the cure.

The vulcanization may be carried out in a closed mold under suitable pressure, or it may be carried out in an oven in air or any suitable atmosphere.

The following examples illustrate the invention and contrast it with the prior art. All parts are by weight.

EXAMPLE 1

*Preparation of the Vulcanizing Agents*

The general methods for the preparation of the curing agents of this invention are detailed below.

A. SYNTHESIS OF METHYLENE-BRIDGED TRIPHENOL-DIMETHANOLS

An example of a curing agent of this invention is 2,6-bis - (2 - hydroxy-3-hydroxy-methyl-5-tert-butylbenzyl)-4-tert-butylphenol. Compounds of this nature contain two free hydroxymethyl groups and can be prepared by the following two-step procedure from known compounds typified by 2,6-bis-(hydroxymethyl)-4-tert-butylphenol. All parts and percentages are by weight.

*Step #1.—Formation of an alt-dimethylenetriphenol.—* A mixture of 6000 parts of benzene, 3000 parts of p-tert-butylphenol (ca. 20 moles), and 2 parts of p-toluenesulfonic acid is heated to boiling under a reflux condenser equipped with water tap. Then 840 parts of 2,6-bis-(hydroxymethyl)-4-tert-butylphenol (4 moles) is added gradually during a few hours to the mixture through a tube which extends to the bottom of the container. During the addition, which causes a mild exothermic reaction, white crystals of 2,6-bis-(2-hydroxy-5-tert-butylbenzyl)-4-tert-butylphenol precipitate. The mixture is refluxed until water no longer appears in the trap. The mixture then is cooled to room temperature and filtered, and the 2,6 - bis - (2 - hydroxy - 5 - tert-butylbenzyl)-4-tert-butylphenol is slurried with 2000 parts of benzene and filtered again. The yield of air-dried methylene-bridged triphenol is 920 parts (40% of theory). The melting point without purification is 217–220° C. and the neutralization equivalent is 480–485 (theory, 474).

The filtrates can now be combined, and mixed with 1200 parts of p-tert-butylphenol and one part of p-toluenesulfonic acid for making a second batch of 2,6-bis-(2-hydroxy-5-tert-butylbenzyl)-4-tert-butylphenol. The rest of the process is carried out as described above. The total yield from batch one and batch two of 2,6-bis-(2-hydroxy-5-tert-butylbenzyl)-4-tert-butylphenol is at least 1500 parts (at least 79% of theory). A considerable excess of p-tert-butylphenol is used in the step #1 reaction to insure maximum conversion of the bis(hydroxymethyl)-tert-butylphenol to the desired product.

*Step #2.—Hydroxymethylation.—* A clear solution of 480 parts of sodium hydroxide, 4000 parts of water, 2400 parts of 95% ethyl alcohol, 1422 parts of 2,6-bis-(2-hydroxy-5-tert-butylbenzyl)-4-tert-butylphenol and 900 parts of paraformaldehyde is left standing at room temperature for four days without stirring. During this time, the mono-sodium salt of 2,6-bis-(2-hydroxy-3-hydroxymethyl-5-tert-butylbenzyl)-4-tert-butylphenol crystallizes. It is filtered, slurried with a mixture of 2000 parts of water and 1600 parts of 95% ethyl alcohol, and filtered again. Then it is dissolved in a mixture of 270 parts of acetic acid and 200 parts of acetone. The solution is poured into 1000 parts of stirred water to precipitate white 2,6 - bis - (2-hydroxy-3-hydroxymethyl-5-tert-butylbenzyl)-4-tert-butylphenol, which is filtered, washed with water and air-dried. Then it is slurried in 5500 parts of petroleum ether (B.P. 60–110° C.), filtered, and dried. The yield of 2,6-bis-(2-hydroxy-3-hydroxymethyl-5-tert-butylbenzyl)-4-tert-butylphenol is 1306 parts (81.4% of theory). It melts at 140–145° C. with decomposition (the bath should be preheated to approximately the melting point before the melting point tube is put into it). Hydroxymethyl content found, 11.8% (theory, 11.6%).

Homologs of the above compound (the product of step #2) which likewise cure butyl rubber at a practical rate without an accelerator have been made by this method, as follows:

2,6-bis-(2 - hydroxy-3-hydroxymethyl-5-tert-butylbenzyl)-4-methylphenol, melting point, ca. 25° C.; percent hydroxymethyl found, 10.9 (calculated, 12.6)

2,6-bis-(2-hydroxy-3-hydroxymethyl -5 - ethylbenzyl)-4-isopropylphenol, melting point 125–130° C.; percent hydroxymethyl found, 14.6 (calculated, 13.4)

B. CHLOROMETHYLATION OF THE METHYLENE-BRIDGED TRIPHENOLS

Hydrochloric esters of the methylene-bridged triphenol-dimethanols, which likewise cure butyl rubber at a practical rate without an accelerator, can be prepared by the following procedure, using as starting materials the methylene-bridged triphenols prepared according to step #1, section A, above.

Hydrogen chloride is bubbled into 3650 parts of stirred glacial acetic acid at room temperature, to the point of saturation, after which 180 parts (6.0 moles) of paraformaldehyde is added. To this mixture is added 948 parts (2.0 moles) of 2,6-bis-(2-hydroxy-5-tert-butylbenzyl)-4- tert-butylphenol. A mild exotherm raises the reaction temperature to 50–55° C. Hydrogen chloride gas is bubbled through the mixture continuously during the reaction. As the chloromethylation reaction proceeds, the methylene-bridged triphenol gradually dissolves. After 3 hours, the reaction is complete and the resultant clear solution is poured into 20,000 parts of cold tap water. The resulting precipitate, which is 2,6-bis-(2-hydroxy-3-chloromethyl-5-tert-butylbenzyl)-4-tert-butylphenol, is filtered, washed with water and air-dried. The yield is 1126 parts (98.5% of theory). Melting point, 95–100° C.; percent chlorine found, 12.4 (calculated, 12.5).

The corresponding hydrobromic diester, namely, 2,6-bis-(2 - hydroxy - 3 - bromomethyl-5-tert-butylbenzyl)-4-tert-butylphenol, which likewise cures butyl rubber at a practical rate without an accelerator, can be made by simply using dry hydrogen bromide gas in place of the hydrogen chloride gas. The pale cream-colored solid melts at about 100° C. with decomposition.

C. SYNTHESIS OF THE BENZYLIC DIESTERS OF METHYLENE-BRIDGED TRIPHENOLDIMETHANOLS WITH ALIPHATIC MONOCARBOXYLIC ACIDS

The benzylic di-esters of methylene-bridged triphenoldimethanols with aliphatic monocarboxylic acids are most easily prepared from the corresponding di-chloromethylated, methylene-bridged triphenols. The following preparation of 2,6-bis-(2-hydroxy-3-acetoxymethyl-5-tert-butylbenzyl)-4-tert-butylphenol demonstrates the general method of synthesis. Forty-one parts of sodium acetate, 530 parts of acetic acid and 106 parts of 2,6-bis-(2-hydroxy-3-chloromethyl-5-tert-butylbenzyl) - 4 - tert - butyl phenol (0.185 mole) are mixed together at 25° C. The reaction mixture warms up spontaneously to 55–60° C., and is kept at this temperature for 60 minutes. The reaction mixture is then poured into 5000 parts of cold water, the precipitate filtered, washed with cold water and air-dried. The yield of 2,6-bis-(2-hydroxy-3-acetoxymethyl-5-tert-butylbenzyl)-4-tert-butylphenol is 109 parts (96% of theory); melting point, 95–100° C. The Beilstein test for halogen is negative.

Other homologous diesters can be made by simply substituting the sodium salt of the appropriate monocarboxylic acid for the sodium acetate in the procedure of paragraph (C), above, and using acetone as the solvent medium, in place of acetic acid, in order to avoid the possibility of obtaining mixed esters containing acetate as well as the desired other monocarboxylate. In the event that a non-filterable precipitate is obtained upon pouring the reaction product one may resort to an ether extraction of the product for the final work-up.

By the procedure detailed in the preceding paragraph, 114.2 parts of 2,6-bis-(2-hydroxy-3-chloromethyl-5-tert-butylbenzyl)-4-tert-butylphenol (0.2 mole) was converted into 2,6-bis-(2-hydroxy-3-stearoyloxymethyl-5-tert-butylbenzyl)-4-tert-butylphenol, 153 parts of sodium stearate and 590 parts of acetone being used. The product was a soft, waxy solid; yield, 178 parts. Beilstein test for halogen was negative.

EXAMPLE 2

This example will demonstrate the curing of butyl rubber with a methylene-bridged triphenoldimethanol, viz., 2,6-bis-(2-hydroxy-3-hydroxymethyl-5-tert - butylbenzyl)-4-tert-butylphenol, at a practical rate without an acidic accelerator. The rate of cure by this curing agent is contrasted with that of Super Beckacite 1001, a phenolic resole for curing butyl rubber, which exemplifies the invention disclosed in U.S. Patent 2,701,895.

A masterbatch was mixed in a Banbury internal mixer in the proportion of 100 parts of IIR–15 (formerly known as GR–I–15, which is a copolymer of isobutylene and isoprene, 98:2, according to Rubber Age 74, 561 (1954)), 40 parts of carbon black, 6 parts of a hydrocarbon oil, and one part of Super Beckacite 1001 (said to be a resole made from 4-tert-butylphenol and formaldehyde in the presence of sodium hydroxide). The mixture was masticated for 10 minutes in the Banbury mixer at 350° F. in order to lower the hysteresis of the ultimate cured stocks to be made from the masterbatch. Portions of the masterbatch were then mixed individually on a rubber mill with the materials shown below to form a series of stocks. Portions of the stocks were cured in 6″ x 6″ x 0.1″ molds under pressure separately at 145° C. and 153° C. for the times shown. The stocks were cooled to room temperature and tested conventionally, as shown, to determine the extent of cure. The tensile strength and elongation at break were measured on a Scott tensile machine and the modulus at 300% elongation was measured on an autographic stress-strain machine.

| Stock | 1 | 2 | 3 | 4 | 5 |
|---|---|---|---|---|---|
| Masterbatch | 147 | 147 | 147 | 147 | 147 |
| 2,6-bis-(2-hydroxy-3-hydroxymethyl-5-tert-butylbenzyl)-4-tert-butylphenol | 3.3 | 6.5 | 9.8 | 16.3 | ----- |
| Super Beckacite 1001 | ----- | ----- | ----- | ----- | 7.5 |

PROPERTIES WHEN CURED AT 145° C.

| Time of Cure (min.) | Tensile, p.s.i. | | | | |
|---|---|---|---|---|---|
| 30 | 440 | 640 | 705 | 780 | 65 |
| 60 | 835 | 1,300 | 1,455 | 1,485 | 110 |
| 120 | 1,140 | 1,780 | 1,945 | 2,070 | 510 |
| 240 | 1,580 | 1,970 | 2,410 | 2,255 | 1,220 |

| | Elongation, percent | | | | |
|---|---|---|---|---|---|
| 30 | 1,230 | 1,080 | 990 | 910 | 2,800 |
| 60 | 820 | 750 | 690 | 700 | 1,950 |
| 120 | 700 | 650 | 620 | 610 | 1,200 |
| 240 | 640 | 570 | 500 | 400 | 790 |

| | Modulus at 300% Elong. | | | | |
|---|---|---|---|---|---|
| 30 | 75 | 100 | 100 | 125 | 25 |
| 60 | 160 | 250 | 300 | 325 | 50 |
| 120 | 225 | 400 | 500 | 575 | 75 |
| 240 | 375 | 650 | 800 | 1,000 | 185 |

PROPERTIES WHEN CURED AT 153° C.

| Time of Cure (min.) | Tensile, p.s.i. | | | | |
|---|---|---|---|---|---|
| 30 | 755 | 1,180 | 1,310 | 1,300 | 90 |
| 60 | 1,120 | 1,730 | 2,010 | 2,000 | 430 |
| 120 | 1,490 | 2,140 | 2,220 | 2,110 | 1,070 |
| 240 | 1,840 | 2,000 | 2,200 | 1,900 | 1,600 |

| | Elongation, percent | | | | |
|---|---|---|---|---|---|
| 30 | 870 | 780 | 760 | 800 | 2,800 |
| 60 | 700 | 690 | 690 | 660 | 1,320 |
| 120 | 640 | 630 | 580 | 520 | 830 |
| 240 | 620 | 520 | 500 | 400 | 660 |

| | Modulus at 300% Elong. | | | | |
|---|---|---|---|---|---|
| 30 | 150 | 200 | 225 | 225 | 35 |
| 60 | 225 | 400 | 450 | 525 | 60 |
| 120 | 350 | 600 | 750 | 875 | 150 |
| 240 | 500 | 750 | 975 | 1,200 | 325 |

The above example demonstrates that:

(a) Most unexpectedly, 2,6-bis-(2-hydroxy-3-hydroxymethyl-5-tert-butylbenzyl)-4-tert-butylphenol, a methylene-bridged triphenoldimethanol, cures butyl rubber at a practical rate in the absence of an acidic accelerator.

(b) The curing agent of this invention cures butyl rubber much faster and more completely than does Super Beckacite 1001, a phenolic resole butyl curing agent which exemplifies the invention disclosed in U.S. Patent 2,701,895.

EXAMPLE 3

This example will demonstrate that the curing agents of this invention can also be accelerated with heavy metal halides such as $SnCl_2 \cdot 2H_2O$.

A masterbatch was mixed in a Banbury internal mixer as in Example 1 but without the hydrocarbon oil. Portions of this masterbatch were mixed individually on a rubber mill with the materials shown below to form a series of stocks. Portions of the stock were cured as in Example 1 at 153° C. for the times shown. The stocks were cooled to room temperature and tested conventionally, as shown, to determine the extent of cure.

| Stock | 6 | 7 | 8 | 9 |
|---|---|---|---|---|
| Masterbatch (Example 2) | 141 | 141 | 141 | 141 |
| Super Beckacite 1001 | 6.6 | 6.6 | | |
| 2,6-Bis-(2-hydroxy-3-hydroxy methyl-5-tert-butylbenzyl)-4-tert-butylphenol | | | 6.6 | 6.6 |
| SnCl₂.2H₂O | | 1.8 | | 1.8 |

PHYSICAL PROPERTIES

| Time of Cure (min.) | Tensile strength (p.s.i.) | | | |
|---|---|---|---|---|
| 15 | 110 | 1,000 | 1,140 | 2,100 |
| 30 | 440 | 2,010 | 1,800 | 2,200 |
| 60 | 1,000 | 2,000 | 2,280 | 2,280 |
| 120 | 1,800 | 1,820 | 2,170 | 2,170 |

| | Elongation (percent) | | | |
|---|---|---|---|---|
| 15 | 2,500 | 540 | 810 | 400 |
| 30 | 1,380 | 460 | 670 | 450 |
| 60 | 860 | 380 | 550 | 390 |
| 120 | 650 | 300 | 440 | 360 |

| | Modulus at 300% Elongation (p.s.i.) | | | |
|---|---|---|---|---|
| 15 | 50 | 750 | 240 | 910 |
| 30 | 90 | 900 | 400 | 1,150 |
| 60 | 200 | 1,280 | 630 | 1,320 |
| 120 | 420 | 1,820 | 1,210 | 1,430 |

The above example shows that stannous chloride accelerates the cure of butyl by both 2,6-bis-(2-hydroxy-3-hydroxymethyl-5-tert-butylbenzyl)-4-tert-butylphenol and Super Beckacite 1001, and brings the stocks to about the same level of cure (stocks 12 and 14). However, because our curing agent when unaccelerated unexpectedly cures butyl much more rapidly than does unaccelerated Super Beckacite, there is a great advantage in using our new curing agent in stocks which contain, or are next to, textile materials which would be tenderized by accelerators such as stannous chloride. Only stocks 13 and 14 illustrate this invention.

EXAMPLE 4

This example will demonstrate the practice of this invention with two homologs of the methylene-bridged triphenoldimethanol of Example 3. These are: 2,6-bis-(2-hydroxy-3-hydroxymethyl - 5 - ethylbenzyl)-4-isopropylphenol and 2,6-bis-(2-hydroxy-3-hydroxymethyl-5-tert-butylbenzyl)-4-methylphenol.

A new masterbatch was mixed in a Banbury internal mixer just like the one in Example 1. Portions of this masterbatch were mixed individually on a rubber mill with the materials shown below to form a series of stocks. Portions of the stocks were cured at 153° C. for the times shown. The stocks were cooled to room temperature and tested conventionally, as shown, to determine the extent of cure.

| Stock | 10 | 11 | 12 |
|---|---|---|---|
| Masterbatch | 147 | 147 | 147 |
| 2,6-bis-(2-hydroxy-3-hydroxymethyl-5-ethylbenzyl)-4-isopropylphenol (0.018 mole) | 8.4 | | |
| 2,6-bis-(2-hydroxy-3-hydroxymethyl-5-tert-butylbenzyl)-4-methylphenol (0.018 mole) | | 8.0 | |
| 2,6-bis-(2-hydroxy-3-hydroxymethyl-5-tert-butylbenzyl)-4-tert-butylphenol (0.018 mole) | | | 9.7 |
| Laurex | 2.5 | 2.5 | 2.5 |

PHYSICAL PROPERTIES

| Time of Cure (min.) | Tensile, p.s.i. | | |
|---|---|---|---|
| 30 | 1,200 | 1,330 | 1,690 |
| 60 | 1,550 | 1,610 | 1,910 |
| 120 | 1,820 | 1,750 | 1,940 |

| | Elongation, percent | | |
|---|---|---|---|
| 30 | 630 | 550 | 650 |
| 60 | 600 | 540 | 600 |
| 120 | 540 | 480 | 500 |

| | Modulus at 300% Elong. | | |
|---|---|---|---|
| 30 | 320 | 410 | 405 |
| 60 | 485 | 545 | 600 |
| 120 | 695 | 850 | 835 |

The above example shows that two homologs (stocks 10 and 11) of 2,6-bis-(2-hydroxy-3-hydroxymethyl-5-tert-butylbenzyl)-4-tert-butylphenol (stock 12) will also cure butyl at a practical rate by the method of this invention.

EXAMPLE 5

This example will demonstrate the curing the butyl rubber with benzylic diesters of a methylene-bridged triphenoldimethanol with two different alkanoic acids. These two diesters are; 2,6-bis-(2-hydroxy-3-acetoxymethyl-5-tert-butylbenzyl)-4-tert-butylphenol and 2,6-(2-hydroxy-3-stearoyloxymethyl-5-tert-butylbenzyl)-4-tert-butylphenol.

A masterbatch was mixed in a Banbury internal mixer in the proportion of 100 parts of IIR-25 (formerly known as GR-I-25), 40 parts of carbon black and as a processing aid, one part of Super Beckacite 1001. The mixture was masticated for 10 minutes in the Banbury mixer at 350° F. in order to lower the hysteresis of the ultimate cured stocks to be made from the masterbatch. Portions of the masterbatch were then mixed individually on a rubber mill with the materials shown below to form the indicated stocks. Portions of the stocks were cured at 153° C., cooled to room temperature and tested conventionally, as shown, to determine the extent of cure.

| Stock | 13 | 14 |
|---|---|---|
| Masterbatch | 141.0 | 141.0 |
| 2,6-bis-(2-hydroxy-3-acetoxymethyl-5-tert-butylbenzyl)-4-tert-butylphenol | 0.3 | |
| 2,6-bis-(2-hydroxy-3-stearoyloxymethyl-5-tert-butylbenzyl)-4-tert-butylphenol | | 10.0 |

PHYSICAL PROPERTIES

| Time of Cure (min.) | Tensile, p.s.i. | |
|---|---|---|
| 15 | 1,560 | 1,550 |
| 30 | 2,000 | 2,230 |
| 60 | 2,310 | 2,380 |
| 120 | 2,270 | 1,080 |

| | Elongation, percent | |
|---|---|---|
| 15 | 700 | 760 |
| 30 | 650 | 720 |
| 60 | 590 | 620 |
| 120 | 480 | 430 |

| | Modulus at 300% Elong.) | |
|---|---|---|
| 15 | 335 | 200 |
| 30 | 525 | 400 |
| 60 | 810 | 700 |
| 120 | 1,135 | 950 |

The above example demonstrates that two different benzyl diesters of methylene-bridged triphenoldimethanols will also cure butyl rubber at a practical rate without an acidic accelerator.

EXAMPLE 6

This example will demonstrate the curing of butyl rubber with the hydrochloric diester of a methylene-bridged triphenoldimethanol, namely, with 2,6-bis-(2-hydroxy-3-chloromethyl-5-tert-butylbenzyl)-4-tert-butylphenol.

A masterbatch in the proportions of 100 parts of IIR-15 (formerly known as GR-I-15 which is a copolymer of isobutylene and isoprene, 98:2, according to Rubber Age 74, 561 (1954)), 40 parts of carbon black, and as a processing aid, one part of Super Beckacite 1001 was masticated for 10 minutes in a Banbury mixer at 350° F. in order to lower the hysteresis of the ultimate cured stocks to be made from the masterbatch. A portion of the masterbatch was then mixed on a rubber mill with the material shown below to form the stock.

Portions of the stock were cured in 6" x 6" x 0.1" molds under pressure at 153° C. for the times shown. The individual cures were cooled to room temperature and tested conventionally, as shown, to determine the extent of cure. The tensile strength, elongation at break, and modulus at 300% elongation were measured as in Example 2.

| Stock | |
|---|---|
| Masterbatch | 141 |
| 2,6-bis-(2-hydroxy-3-chloromethyl-5-tert-butylbenzyl)-4-tert-butyl-phenol | 8 |
| Laurex | |

PHYSICAL PROPERTIES

| Time of cure (min.) | Tensile, p.s.i. |
|---|---|
| 15 | 1,840 |
| 30 | 2,160 |
| 60 | 2,030 |
| 120 | 2,640 |

| | Elongation, percent |
|---|---|
| 15 | 550 |
| 30 | 490 |
| 60 | 420 |
| 120 | 450 |

| | Modulus at 300% Elong. |
|---|---|
| 15 | 650 |
| 30 | 875 |
| 60 | |
| 120 | 1,500 |

The above example shows that the hydrochloric diester of a methylene-bridged triphenoldimethanol, namely 2,6-bis-(2-hydroxy-3-chloromethyl-5-tert-butylbenzyl)-4-tert-butylphenol will cure butyl rubber at a practical rate.

Having thus described my invention, what I claim and desire to protect by Letters Patent is:

1. A method of vulcanizing which comprises reacting 100 parts by weight of an elastomeric copolymer of a major proportion of isoolefin containing from 4 to 7 carbon atoms and a minor proportion of conjugated diolefin containing from 4 to 8 carbon atoms copolymerizable therewith, with from about 3 to about 16 parts by weight of a curing agent consisting essentially of 2,6 - bis - (2 - hydroxy - 3 - hydroxymethyl - 5 - tert - butylbenzyl) - 4 - tert - butylphenol at a temperature in the range from about 125° to about 200° C. for a period of from 2 minutes to 8 hours.

2. A vulcanizate comprising 100 parts by weight of an elastomeric copolymer of a major proportion of isoolefin containing from 4 to 7 carbon atoms and a minor proportion of conjugated diolefin containing from 4 to 8 carbon atoms, and from about 3 to about 16 parts by weight of a curing agent consisting essentially of 2,6 - bis - (2 - hydroxy - 3 - hydroxymethyl - 5 - tert - butylbenzyl) - 4 - tert-butylphenol.

3. A method of vulcanizing as in claim 1, wherein the said elastomeric copolymer of isoolefin:diolefin is isobutylene:isoprene.

4. A vulcanizate as in claim 2, wherein the said elastomeric copolymer of isoolefin:diolefin is isobutylene:isoprene.

References Cited in the file of this patent

UNITED STATES PATENTS

| | | |
|---|---|---|
| 2,701,895 | Tawney et al. | Feb. 15, 1955 |
| 2,773,907 | Sullivan | Dec. 11, 1956 |
| 2,898,322 | Shepard | Aug. 4, 1959 |
| 2,972,600 | Braidwood | Feb. 21, 1961 |
| 2,985,608 | Higgins et al. | May 23, 1961 |

OTHER REFERENCES

"Phenoplasts" (Carswell), published by Interscience Publishers (New York), 1950 (pages 17–22 relied on).

Chem. Ber. 74, pages 205–214 (1941).